United States Patent
Cole

(10) Patent No.: US 10,283,100 B1
(45) Date of Patent: May 7, 2019

(54) LYRICS DISPLAY APPARATUS FOR AN AUTOMOBILE

(71) Applicant: Jesse Cole, Clayton, IN (US)

(72) Inventor: Jesse Cole, Clayton, IN (US)

( * ) Notice: Subject to any disclaimer, the term of this patent is extended or adjusted under 35 U.S.C. 154(b) by 0 days.

(21) Appl. No.: 15/250,332

(22) Filed: Aug. 29, 2016

(51) Int. Cl.
| | |
|---|---|
| *G09G 3/00* | (2006.01) |
| *G10H 1/36* | (2006.01) |
| *G02B 27/01* | (2006.01) |
| *H04R 1/02* | (2006.01) |
| *G09G 5/00* | (2006.01) |
| *G06F 16/638* | (2019.01) |
| *G06F 16/683* | (2019.01) |
| *H04M 1/60* | (2006.01) |

(52) U.S. Cl.
CPC ......... *G10H 1/368* (2013.01); *G02B 27/0101* (2013.01); *G02B 27/0149* (2013.01); *G06F 16/638* (2019.01); *G06F 16/685* (2019.01); *G09G 3/002* (2013.01); *G09G 5/003* (2013.01); *H04R 1/028* (2013.01); *G02B 2027/014* (2013.01); *G02B 2027/0141* (2013.01); *G09G 2380/10* (2013.01); *G10H 2220/011* (2013.01); *G10H 2240/141* (2013.01); *H04M 1/6083* (2013.01); *H04R 2499/13* (2013.01)

(58) Field of Classification Search
CPC .............. G10H 1/368; G06F 17/30769; G06F 17/30746; G09G 5/003; G09G 3/002; G02B 27/0149; G02B 27/0101; G02B 2027/014; G02B 2027/0141; H04R 1/028; H04R 2499/13

See application file for complete search history.

(56) References Cited

U.S. PATENT DOCUMENTS

| | | | |
|---|---|---|---|
| 5,561,849 A | 10/1996 | Mankovitz | |
| 7,461,122 B2 | 12/2008 | Kawana | |
| 9,118,867 B2 | 8/2015 | McCary | |
| 9,430,931 B1* | 8/2016 | Liu | G08B 21/24 |
| 9,659,577 B1* | 5/2017 | Langhammer | G10L 21/06 |
| 2010/0270257 A1* | 10/2010 | Wachman | G06F 19/3462 215/228 |
| 2012/0194448 A1* | 8/2012 | Rothkopf | A45C 13/002 345/173 |
| 2012/0244969 A1* | 9/2012 | Binder | A63H 33/18 473/570 |
| 2014/0362576 A1* | 12/2014 | Degner | G06F 1/20 362/253 |
| 2017/0123487 A1* | 5/2017 | Hazra | G06F 3/015 |

(Continued)

*Primary Examiner* — Premal R Patel

(57) ABSTRACT

A lyrics display apparatus for an automobile including a lower base unit and an upper base unit. A bottom side of the lower base unit is removably disposed on a dashboard of an automobile. A rechargeable battery, a first storage element, and a central processing unit are disposed within the upper base unit. A charging port, at least one battery status indicator light, an activation control, and a display screen are disposed on the upper base unit. A projector, a speaker, and a microphone are disposed on the upper side of the upper base. The central processing unit is configured to recognize and acquire lyrics of a song from the first storage element when the microphone relays the song to the central processing unit. The projector is configured to display lyrics of the song recognized and acquired by the central processing unit onto a windshield of an automobile.

7 Claims, 5 Drawing Sheets

(56) References Cited

U.S. PATENT DOCUMENTS

2017/0238076 A1* 8/2017 Wengreen ............... H04R 1/02
  381/189
2017/0311063 A1* 10/2017 Lee ....................... H04R 1/028

* cited by examiner

LYRICS DISPLAY APPARATUS FOR AN AUTOMOBILE

BACKGROUND OF THE INVENTION

Various types of lyrics display apparatuses are known in the prior art. However, what has been needed is a lyrics display apparatus for an automobile including a lower base unit and an upper base unit, with a bottom side of the lower base unit removably disposed on a dashboard of an automobile. What has been further needed is a rechargeable battery, a first storage element, and a central processing unit disposed within the upper base unit; a charging port, at least one battery status indicator light, an activation control, and a display screen disposed on the upper base unit; and a projector, a speaker, and a microphone disposed on the upper side of the upper base. Lastly, what has been needed is for the central processing unit to be configured to recognize and acquire lyrics of a song from the first storage element when the microphone relays the song to the central processing unit and for the projector to be configured to display lyrics of the song recognized and acquired by the central processing unit onto a windshield of the automobile. The lyrics display apparatus for an automobile is uniquely structured to allow the lyrics of a song played in an automobile to be easily displayed so that passengers within the automobile can safely sing the words without a driver attempting to look up the words on his cellular phone while driving.

FIELD OF THE INVENTION

The present invention relates to lyrics display apparatuses, and more particularly, to a lyrics display apparatus for an automobile.

SUMMARY OF THE INVENTION

The general purpose of the present lyrics display apparatus for an automobile, described subsequently in greater detail, is to provide a lyrics display apparatus for an automobile which has many novel features that result in a lyrics display apparatus for an automobile which is not anticipated, rendered obvious, suggested, or even implied by prior art, either alone or in combination thereof.

To accomplish this, the present lyrics display apparatus for an automobile includes a hollow cylindrical lower base unit and a hollow cylindrical upper base unit. The hollow cylindrical lower base unit has a bottom side, a continuous side surface, and a threaded open top side. The bottom side of the hollow cylindrical lower base unit is removably disposed on a dashboard of an automobile. The bottom side of the hollow cylindrical lower base unit is optionally rubberized for a stronger gripping surface on the dashboard of the automobile. The hollow cylindrical upper base unit has an upper side, a continuous side section, and a threaded open lower side removably engageable with the threaded open top side of the hollow cylindrical lower base unit.

A rechargeable battery, a first storage element, and a central processing unit are disposed within the hollow cylindrical upper base unit. The central processing unit has wireless capabilities. A charging port, at least one battery status indicator light, an activation control, and a display screen are disposed on the hollow cylindrical upper base unit. The activation control is configured to activate each of the components of the lyrics display apparatus for an automobile. A projector is medially disposed on the upper side of the hollow cylindrical upper base. A speaker and a microphone are also disposed on the upper side of the hollow cylindrical upper base. The rechargeable battery, the first storage element, the central processing unit, the charging port, the at least one battery status indicator light, the activation control, the display screen, the projector, the speaker, and the microphone are in operational communication with each other.

The battery status indicator light is configured to illuminate a power level of the rechargeable battery. The central processing unit, using lyrics recognition and matching software already known in the art, is configured to recognize and acquire lyrics of a song from the first storage element when the microphone relays the song to the central processing unit. The central processing unit is also configured to simultaneously display a name of the song and an artist of the song on the display screen. Lastly, the projector is configured to display lyrics of the song recognized and acquired by the central processing unit onto a windshield of the automobile.

The lyrics display apparatus for an automobile optionally further includes a second storage element disposed within the hollow cylindrical upper base unit. The second storage element is in operational communication with the central processing unit. The central processing unit is configured to display a plurality of pictures stored within the second storage element on the display screen. The central processing unit is also optionally configured to wirelessly communicate with a cellular phone by allowing a user to speak and, alternately, to listen to a call on the cellular phone through each of the microphone and the speaker, respectively. The upper side of the hollow cylindrical upper base unit is optionally diagonally disposed toward an occupant of the automobile in order to provide for a more directed sound through each of the microphone and the speaker. It is envisioned that the lyrics display apparatus for an automobile can not only connect directly to the automobile's audio jack, but can use a battery of the automobile as a power source through a charging port on the automobile.

Thus has been broadly outlined the more important features of the present lyrics display apparatus for an automobile so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
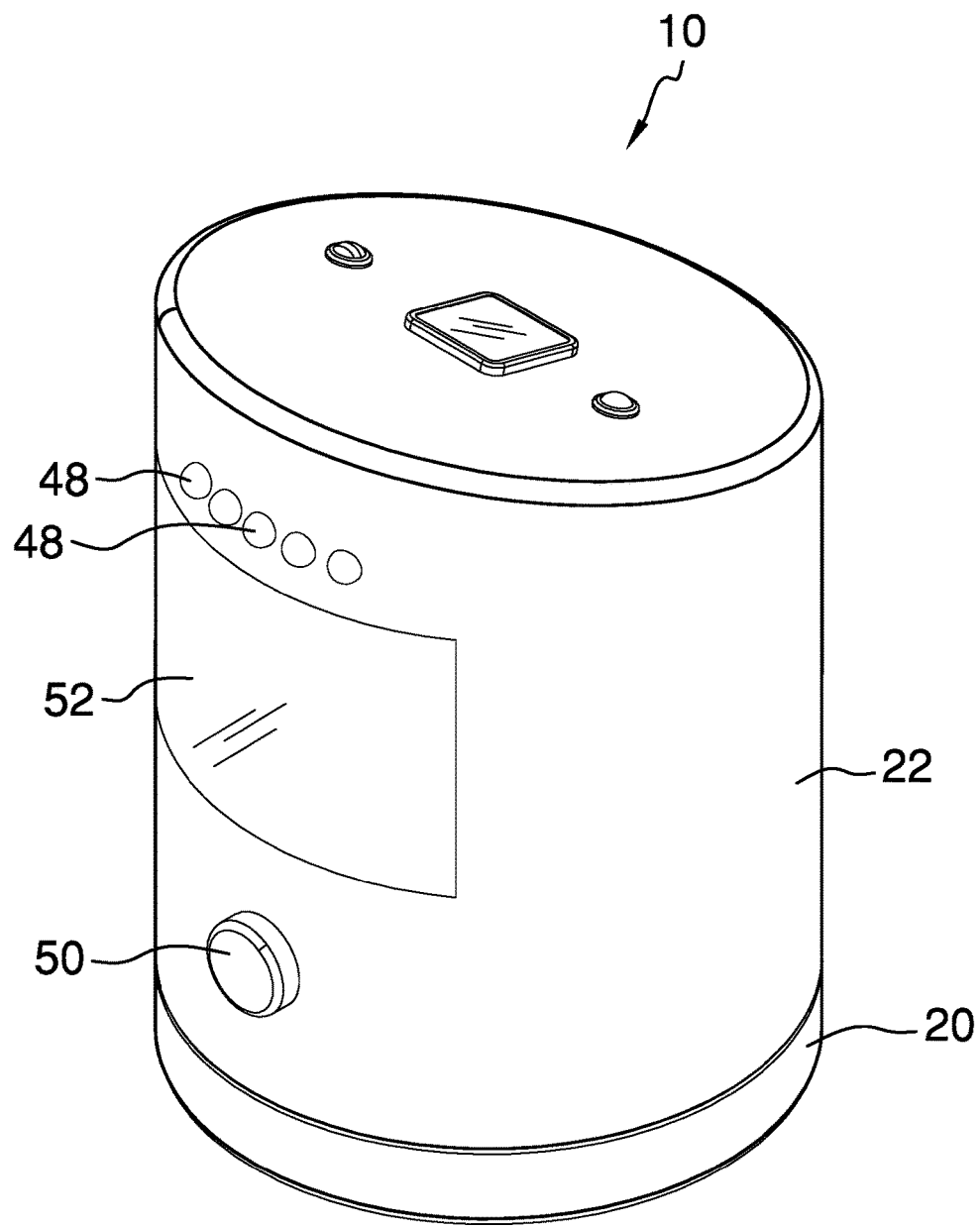
FIG. 1 is a front isometric view.
Figure 2:
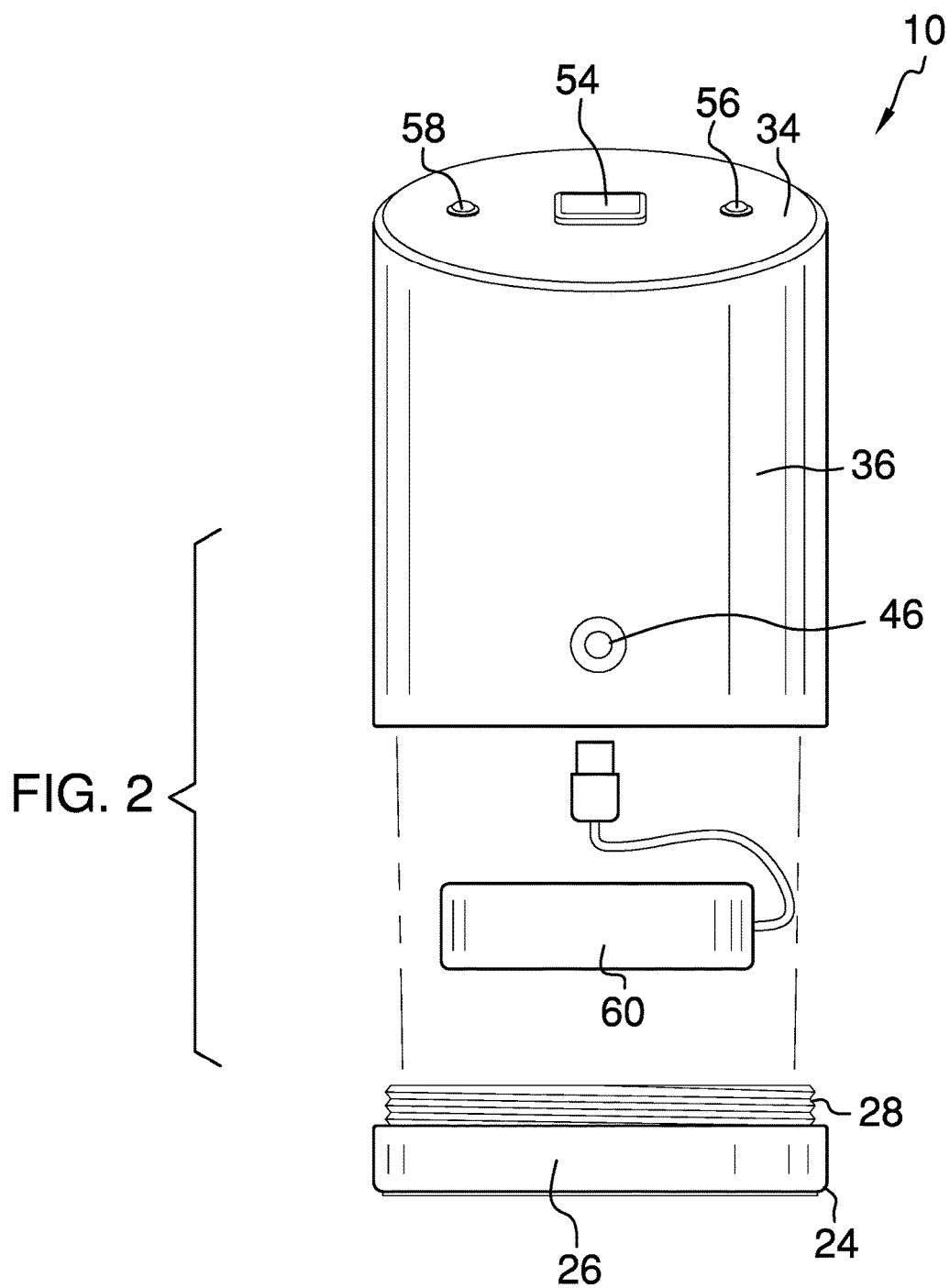
FIG. 2 is a rear elevation view.
Figure 3:
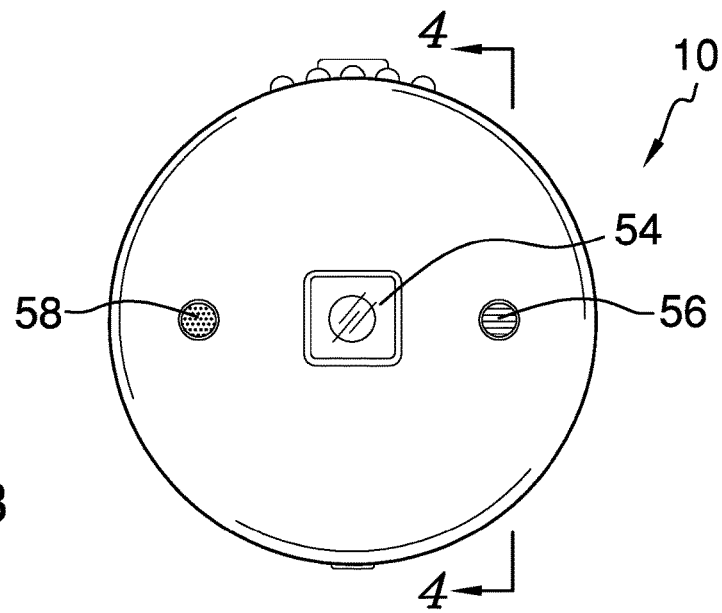
FIG. 3 is a top plan view.
Figure 4:
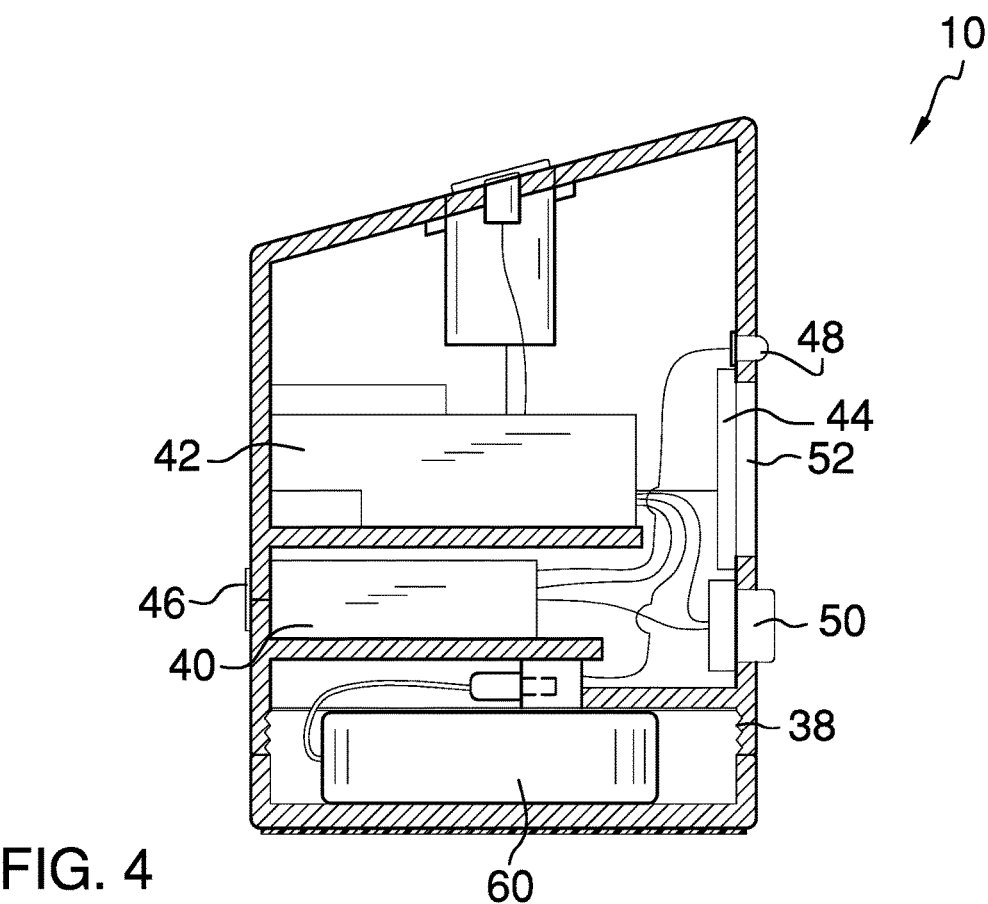
FIG. 4 is a cross-sectional view taken along line 4-4 of FIG. 3.
Figure 5:
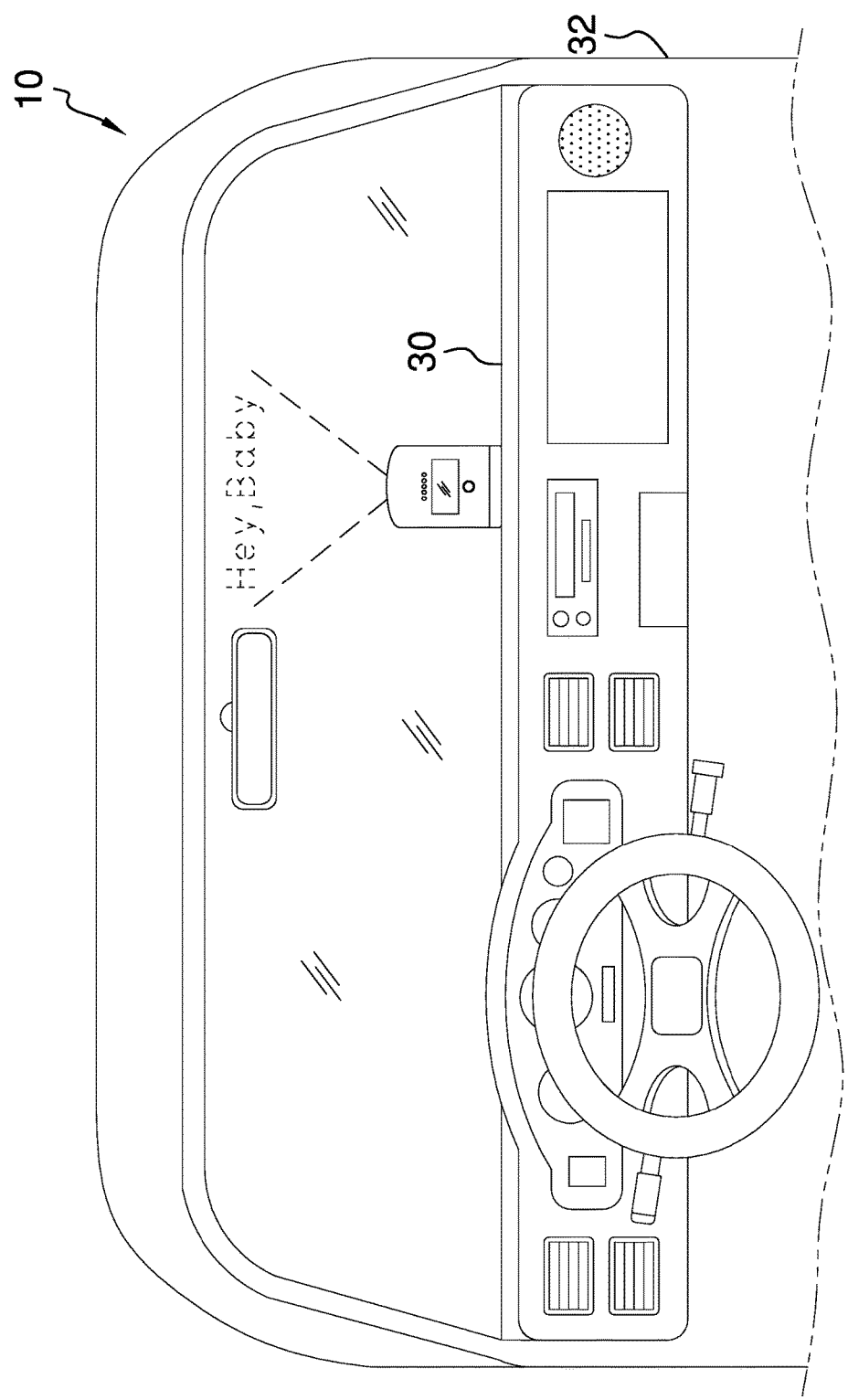
FIG. 5 is an in use view.
Figure 6:
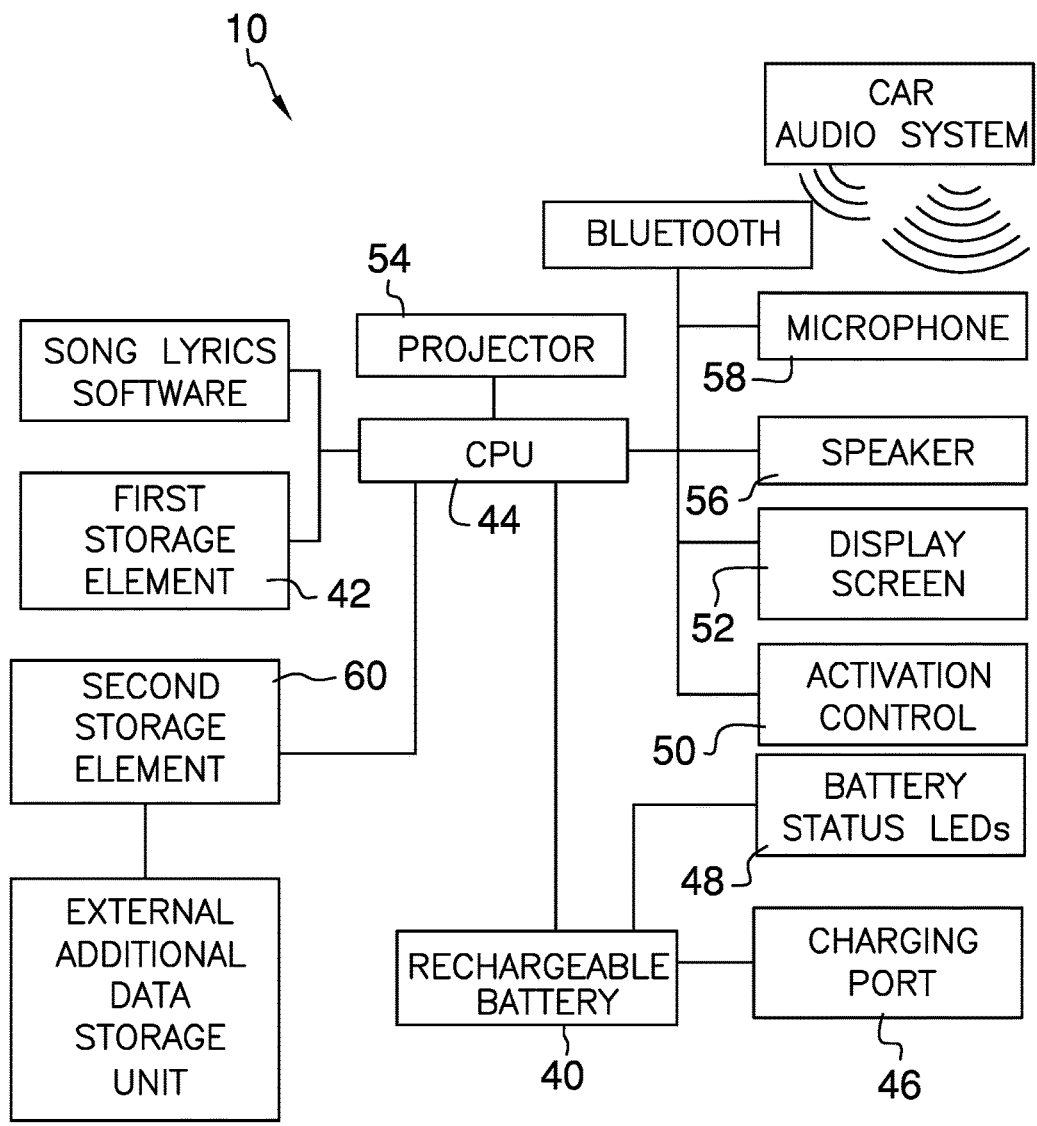
FIG. 6 is a block diagram.

With reference now to the drawings, and in particular FIGS. 1 through 6 thereof, an example of the instant lyrics display apparatus for an automobile employing the principles and concepts of the present lyrics display apparatus for an automobile and generally designated by the reference number 10 will be described.

Referring to FIGS. 1 through 6 the present lyrics display apparatus for an automobile 10 is illustrated. The lyrics display apparatus for an automobile 10 includes a hollow cylindrical lower base unit 20 and a hollow cylindrical upper base unit 22. The hollow cylindrical lower base unit 20 has a bottom side 24, a continuous side surface 26, and a threaded open top side 28. The bottom side 24 of the hollow cylindrical lower base unit 20 is removably disposed on a dashboard 30 of an automobile 32. The bottom side 24 of the hollow cylindrical lower base unit 20 is optionally rubberized. The hollow cylindrical upper base unit 22 has an upper side 34, a continuous side section 36, and a threaded open lower side 38 removably engageable with the threaded open top side 28 of the hollow cylindrical lower base unit 20.

A rechargeable battery 40, a first storage element 42, and a central processing unit 44 are disposed within the hollow cylindrical upper base unit 22. The central processing unit 44 has wireless capabilities. A charging port 46, at least one battery status indicator light 48, an activation control 50, and a display screen 52 are disposed on the hollow cylindrical upper base unit 22. A projector 54 is medially disposed on the upper side 34 of the hollow cylindrical upper base 22. A speaker 56 and a microphone 58 are also disposed on the upper side 34 of the hollow cylindrical upper base 22. The rechargeable battery 40, the first storage element 42, the central processing unit 44, the charging port 46, the at least one battery status indicator light 48, the activation control 50, the display screen 52, the projector 54, the speaker 56, and the microphone 58 are in operational communication with each other.

The lyrics display apparatus for an automobile optionally further includes a second storage element 60 disposed within the hollow cylindrical upper base unit 22. The second storage element 60 is in operational communication with the central processing unit 44. The upper side 34 of the hollow cylindrical upper base unit 22 is optionally diagonally disposed.

What is claimed is:

1. A lyrics display apparatus for an automobile comprising:
    a hollow cylindrical lower base unit having a bottom side, a continuous side surface, and a threaded open top side;
    a hollow cylindrical upper base unit having an upper side, a continuous side section, and a threaded open lower side removably engageable with the threaded open top side of the hollow cylindrical lower base unit;
    a rechargeable battery disposed within the hollow cylindrical upper base unit; a first storage element disposed within the hollow cylindrical upper base unit;
    a central processing unit disposed within the hollow cylindrical upper base unit, the central processing unit having wireless capabilities;
    a charging port disposed on the hollow cylindrical upper base unit;
    at least one battery status indicator light disposed on the hollow cylindrical upper base unit;
    an activation control disposed on the hollow cylindrical upper base unit; a display screen disposed on the hollow cylindrical upper base unit;
    a projector medially disposed on the upper side of the hollow cylindrical upper base;
    a speaker disposed on the upper side of the hollow cylindrical upper base; and a microphone disposed on the upper side of the hollow cylindrical upper base;
        wherein the rechargeable battery, the first storage element, the central processing unit, the charging port, the at least one battery status indicator light, the activation control, the display screen, the projector, the speaker, and the microphone are in operational communication with each other;
    wherein the battery status indicator light is configured to illuminate a power level of the rechargeable battery;
    wherein the bottom side of the hollow cylindrical lower base unit is removably disposed on a dashboard of an automobile;
    wherein the central processing unit is configured to recognize and acquire lyrics of a song from the first storage element when the microphone relays the song to the central processing unit;
    wherein the central processing unit is configured to display a name of the song and an artist of the song on the display screen;
    wherein the projector is configured to display lyrics of the song recognized and acquired by the central processing unit onto a windshield of the automobile.

2. The lyrics display apparatus for an automobile of claim 1 further comprising a second storage element disposed within the hollow cylindrical upper base unit, the second storage element in operational communication with the central processing unit, wherein the central processing unit is configured to display a plurality of pictures stored within the second storage element on the display screen.

3. The lyrics display apparatus for an automobile of claim 2 wherein the central processing unit is configured to wirelessly communicate with a cellular phone by allowing a user to speak and, alternately, to listen to a call on the cellular phone through each of the microphone and the speaker, respectively.

4. The lyrics display apparatus for an automobile of claim 3 wherein the bottom side of the hollow cylindrical lower base unit is rubberized.

5. The lyrics display apparatus for an automobile of claim 4 wherein the upper side of the hollow cylindrical upper base unit is diagonally disposed.

6. The lyrics display apparatus for an automobile of claim 1 wherein the bottom side of the hollow cylindrical lower base unit is rubberized.

7. The lyrics display apparatus for an automobile of claim 1 wherein the upper side of the hollow cylindrical upper base unit is diagonally disposed.

* * * * *